United States Patent
Anneken

(10) Patent No.: US 6,890,142 B2
(45) Date of Patent: May 10, 2005

(54) DIRECT CONDENSING TURBINE

(75) Inventor: James G. Anneken, Cincinnati, OH (US)

(73) Assignee: James G. Asseken, Cincinnati, OH (US)

( * ) Notice: Subject to any disclaimer, the term of this patent is extended or adjusted under 35 U.S.C. 154(b) by 21 days.

(21) Appl. No.: 10/267,327

(22) Filed: Oct. 9, 2002

(65) Prior Publication Data

US 2003/0068226 A1 Apr. 10, 2003

Related U.S. Application Data

(60) Provisional application No. 60/328,005, filed on Oct. 9, 2001.

(51) Int. Cl.[7] .................................................. F01D 5/00
(52) U.S. Cl. ............................... 415/1; 415/71; 416/177
(58) Field of Search ............................... 415/71, 90, 1; 416/176, 177, 198 R

(56) References Cited

U.S. PATENT DOCUMENTS

| 1,356,106 | A |   | 10/1920 | Machado |         |
|-----------|---|---|---------|---------|---------|
| 1,456,122 | A | * | 5/1923  | Edney   | 415/71  |
| 2,257,678 | A | * | 9/1941  | Greenlee et al. | 415/71 |
| 4,003,672 | A | * | 1/1977  | Gamell  | 415/71  |
| 4,258,551 | A |   | 3/1981  | Ritzi   | 60/654  |
| 4,529,354 | A |   | 7/1985  | Klepesch | 415/71 |
| 4,773,818 | A |   | 9/1988  | Mitsuhiro | 415/75 |
| 5,186,602 | A |   | 2/1993  | Nakanishi | 415/78 |
| 6,233,942 | B1 |  | 5/2001  | White   | 60/670  |
| 6,434,944 | B2 |  | 8/2002  | White   | 60/670  |

FOREIGN PATENT DOCUMENTS

JP     4081502    3/1992
JP      539795    2/1993

OTHER PUBLICATIONS

Search Report, *PCT/US03/10214*, Aug. 7, 2003.

* cited by examiner

*Primary Examiner*—Ninh H. Nguyen
(74) *Attorney, Agent, or Firm*—Wood, Herron & Evans, LLP

(57) ABSTRACT

A turbine rotor has a spiral involute channel formed in a rotor disk. In one embodiment, the channel has an inlet near the center of the disk and an outlet near the periphery of the disk. Working fluid of the turbine enters the channel at the inlet and is directed along the channel where kinetic energy of the working fluid is transferred to the rotor by way of blades positioned within the channel. A series of rotors may be stacked together to form multiple, parallel flow paths through a turbine.

18 Claims, 5 Drawing Sheets

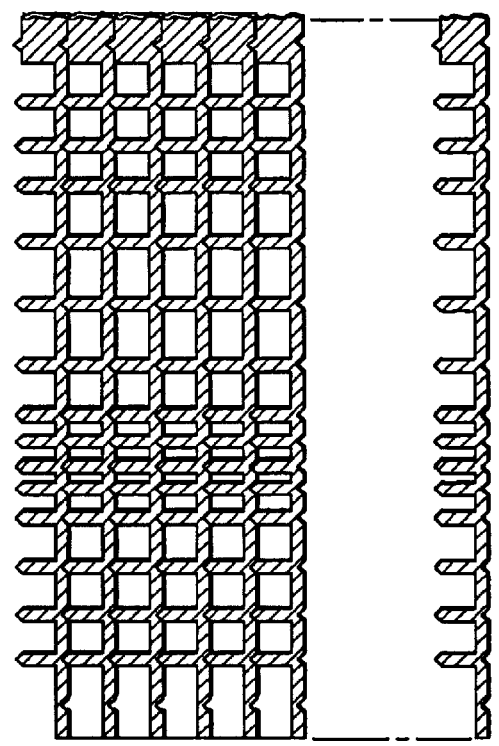
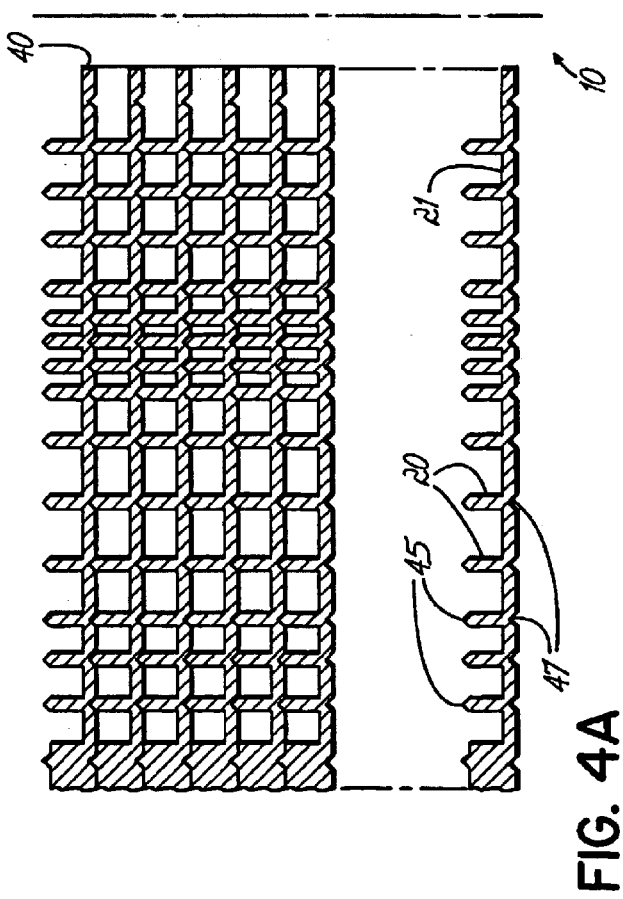
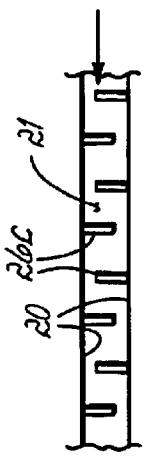
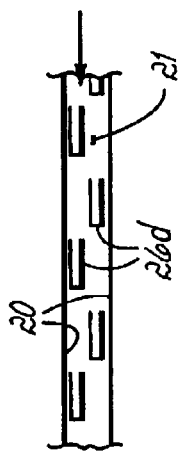
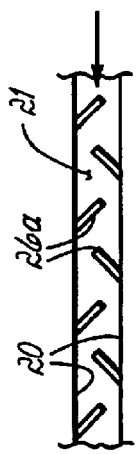
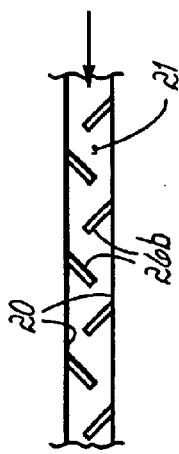
FIG. 4A
FIG. 5A
FIG. 5B
FIG. 5C
FIG. 5D

DIRECT CONDENSING TURBINE

Pursuant to 37 C.F.R. § 1.78(a)(4), this application claims the benefit of and priority to prior filed Provisional Application Ser. No. 60/328,005, filed Oct. 9, 2001, which is expressly incorporated herein by reference.

FIELD OF THE INVENTION

This present invention generally relates to turbines and more particularly to an improved turbine rotor.

BACKGROUND OF THE INVENTION

Turbines are known in the art and are used for various power generation applications. Examples of various turbines are shown in U.S. Pat. Nos. 6,233,942; 5,186,602; and 4,773,818, each of which are hereby incorporated by reference in their entirety. Turbines are classified descriptively in various categories depending upon the arrangement and operation of the particular turbine. For example, turbines may be classified as either axial flow or radial flow turbines, depending upon the flow path through the turbine. The majority of turbines used in the United States are axial flow turbines. The working fluid utilized in a turbine may be water, a combustion gas, or steam; however, the operation of a turbine is based on the same principles regardless of the type of working fluid.

A conventional axial flow turbine design includes fixed stator blades, which are usually attached to interior walls, and moving rotor blades attached to a shaft extending through the turbine. Groups of rotor and stator blades are generally assembled in an alternating arrangement within the turbine, wherein each rotor and stator pair make up a stage of the turbine. The blades are designed to have specially shaped surfaces to accommodate complex flow dynamics of the working fluid as it passes the fixed stators and moving rotors. A conventional axial flow turbine operates by the velocity change of the working fluid through the series of stator and rotor blades, whereby the working fluid imparts motion to the rotors to rotate the shaft which may be connected to a generator or propulsion device. To obtain the best possible efficiency, rotor and stator blades must be manufactured and assembled with very close tolerances to minimize leakage of working fluid around the blades. Efficiency is also improved as the turbine is run at higher rotational speeds and higher operating temperatures. To meet the demands of close tolerances, high operating speeds, and high temperatures, components used in conventional axial flow turbines must be made from special materials and manufactured to exacting tolerances, which therefore makes conventional axial flow turbines quite expensive.

High operating temperatures and rotational speeds of conventional axial flow turbines also have an affect on the service life of components used to make the turbines. The high rotational speed increases stress in components and failure of a single component can damage the entire turbine if it comes in contact another component, or worse, if it breaks off. Because such a critical failure of a turbine is to be avoided, axial flow turbines require periodic overhauls during their service life to ensure that all components are sound. These overhauls are costly and constitute a significant amount of down time during which the turbine cannot be used. Axial flow turbines, which utilize steam as a working fluid, have similar speed and tolerance requirements as axial flow turbines utilizing a combustible gas as the working fluid. In addition, steam turbines require a high steam quality, usually ninety percent or better, in order to prevent damage to the turbine.

There is thus a need for an improved turbine which has a more robust structural design that is less susceptible to critical failure when a component is damaged, and which is less costly to manufacture and maintain. There is also a need for a turbine which eliminates leakage of working fluid to provide increased efficiency. There is also a need for an improved turbine which can utilize a wider range steam quality (i.e. wetter steam) utilized as a working fluid.

SUMMARY OF THE INVENTION

This invention provides an improved turbine rotor design which solves these and other problems associated with prior art turbines and permits the integration of multiple turbine stages into a single rotor disk. To this end, this invention utilizes, in one embodiment, a spiral flow along a rotor disk, as opposed to axial flow through a series of stators and rotors. Advantages over the prior art axial flow turbines are achieved in that the spiral design of the rotor permits a more robust structural design which is less sensitive to manufacturing tolerances, can be made from lower cost materials, and is less susceptible to vibration and critical component failure. The invention also eliminates leakage of working fluid within the turbine and is capable of operating with not only high quality steam, but also steam of lesser quality.

In one aspect of the invention, a rotor disk has an involute-shaped channel formed in the disk. The channel spirals from the center of the disk in an outward fashion towards the periphery of the disk. The channel has an inlet near the center of the disk, whereby the working fluid enters the channel and is directed along the channel to an outlet at the periphery. The outlet may be configured to discharge the working fluid along a path radial to the disk, or the outlet may be configured to discharge to the working fluid along a path substantially parallel to the rotational axis of the disk. The channel has blades positioned along the path of the channel which are arranged and spaced to optimize interaction with the working fluid flowing through the channel, whereby the working fluid imparts rotational motion to the disk. Accordingly, the blades may be positioned in the channel at an angle to the walls of the channel, or they may be arranged substantially perpendicular to the walls of the channel. Alternatively, the blades may be U-shaped baffles positioned within the channel. The invention thus provides a simplified direct flow path which eliminates flow dynamics problems that are associated with conventional axial flow turbines, where high-speed working fluid must be meshed with fixed stator blades and moving rotor blades.

In another aspect of the present invention, the rotor disk may be designed to operate in a reverse fashion, in relation to the description above, wherein the working fluid enters an inlet at the periphery of the disk and is directed along the spiral channel toward the center of the disk.

In another aspect of the invention, the rotor disk is designed to be used with steam as a working fluid. Steam enters the inlet and is directed along the spiral channel towards the outlet, interacting with the blades to impart rotational motion to the disk. The walls of the channel are constructed to form converging and diverging sections along the length of the channel to accommodate the various states of combustion and expansion of the steam/water. In yet another aspect of the present invention, the rotor disk is designed to be used with a combustion gas, whereby the gas is combusted near the center of the disk and subsequently spirals outwardly along the channel, interacting with the blades to impart rotational motion to the disk prior to exiting through the outlet at the disk periphery.

In another aspect of the invention, a series of rotor disks may be stacked adjacent one another to form a larger turbine. The top edge of the walls of the channel are shaped to mate with and mechanically seal against complementary shaped sections formed on the back of an adjacent rotor disk. In this fashion, the channels of the stacked rotor disks comprise a group of parallel flow paths through which the working fluid passes. The stacked disks may be bolted or welded together to ensure that successive disks are sufficiently sealed against one another.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 4A is a detail view of FIG. 3, illustrating an exemplary rotor construction;

FIGS. 5A–5D show various exemplary embodiments of rotor blades for a rotor of the invention.

DETAILED DESCRIPTION

Figure 1:
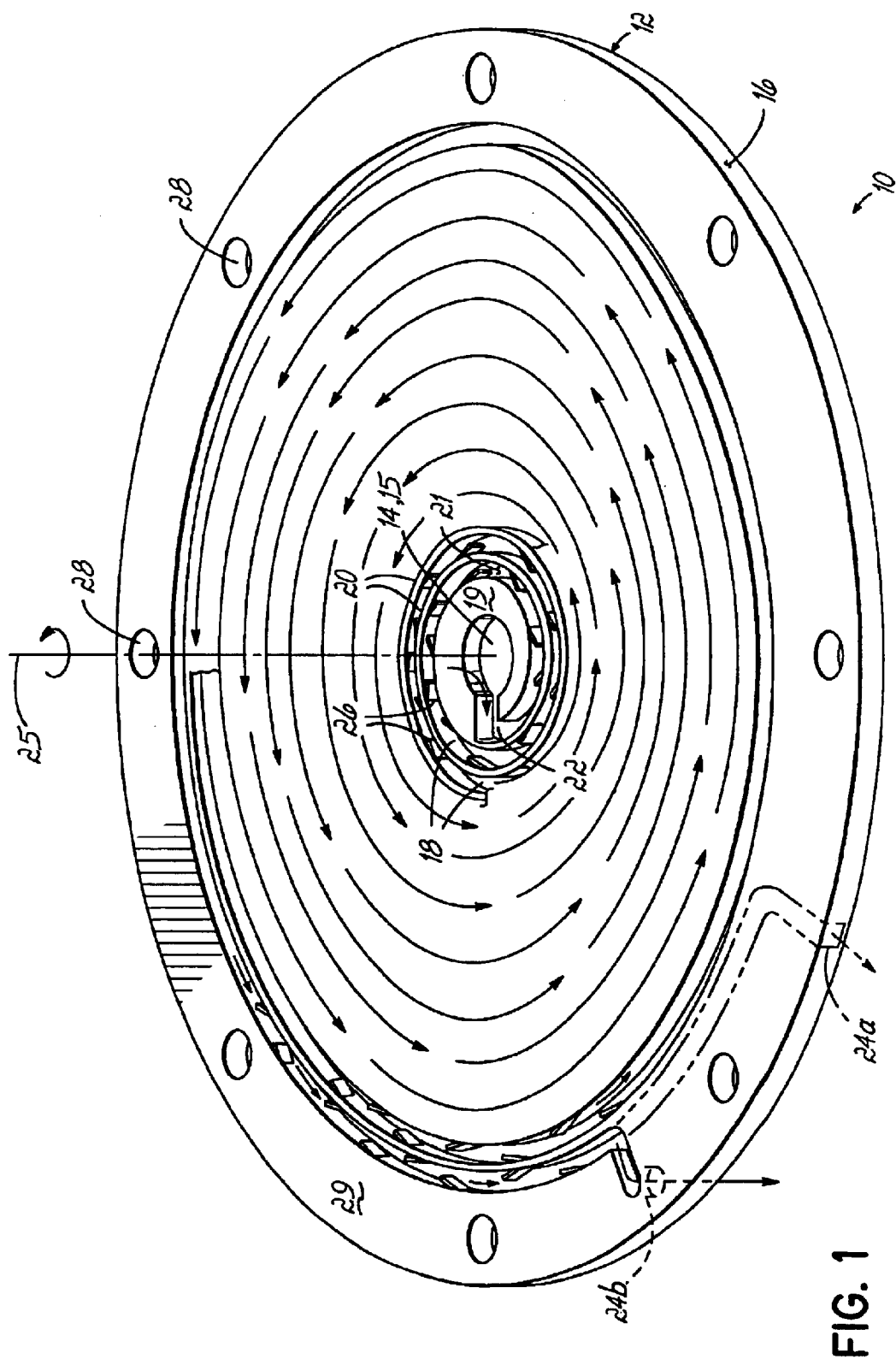
FIG. 1 is a perspective view of rotor disk according to an exemplary embodiment of the invention.
Figure 2:
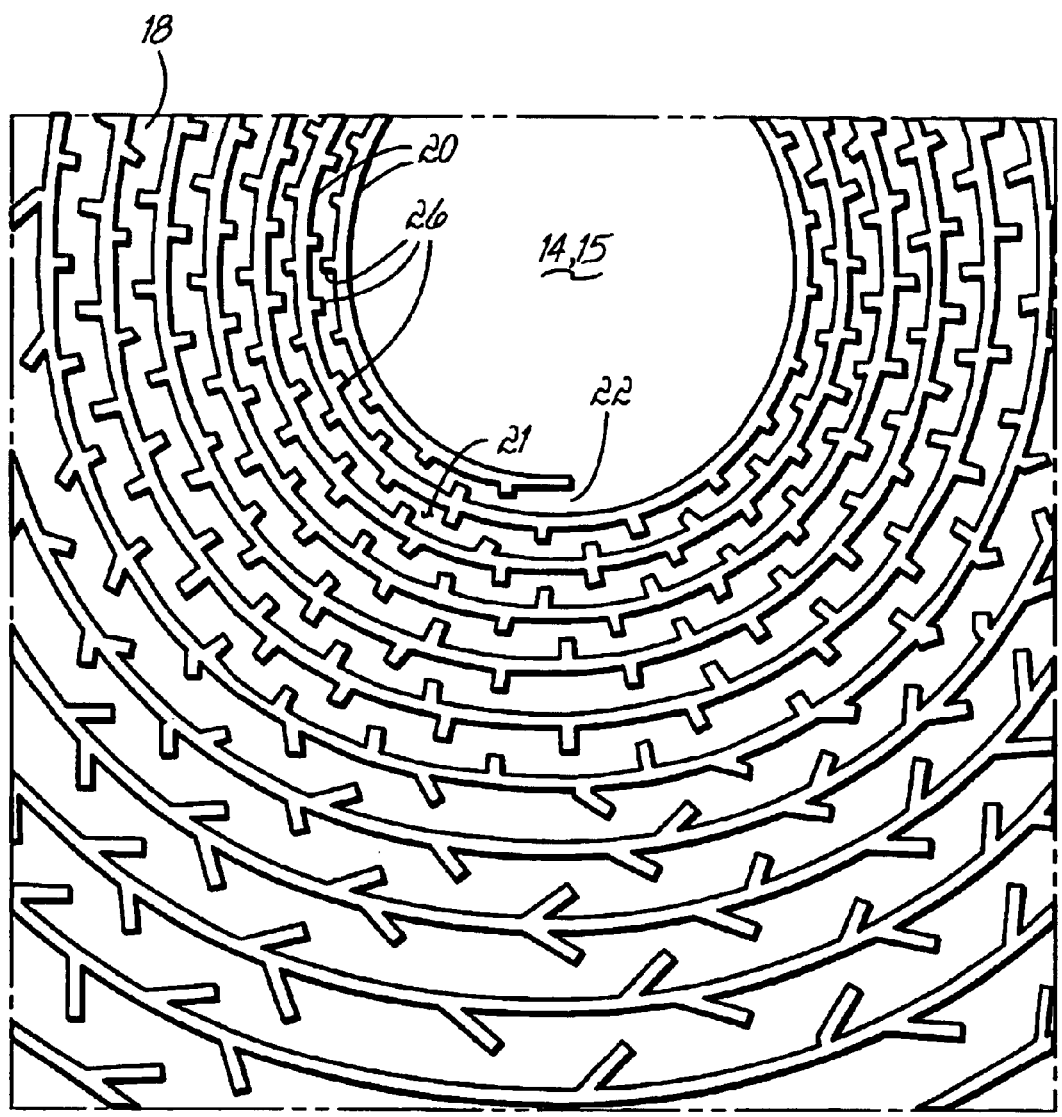
FIG. 2 is a partial plan view of the rotor disk of FIG. 1.

FIGS. 1 and 2 depict an exemplary embodiment of a turbine rotor 10 of the present invention. Rotor 10 includes a disk 12 having a center 14 and an outer periphery 16. The center 14 of disk 12 includes a hole 15 surrounded by an enlarged hub 19. An involute, winding channel 18 originates near the center 14 of disk 12 and spirals outwardly toward the periphery 16 of disk 12. Channel 18 is defined by side walls 20 and bottom wall 21 (e.g., a planar surface of disk 12). Channel 18 is in fluid communication with central hole 15 via a first opening 22 located proximate the center 14 of disk 12. A second opening 24 located near the periphery 16 is in communication with the opposite end of channel 18 and, as illustrated in FIG. 1, second opening 24 may extend radially outward, as illustrated by opening 24a, or it may be directed along an axis substantially parallel with the rotational axis 25 of disk 12, as illustrated by opening 24b. Rotor blades 26 are positioned at various intervals within channel 18 and are attached to side walls 20 and bottom wall 21 of the disk 12, as best shown in FIG. 2.

It will be appreciated that a rotor 10 as described herein may be produced by machining the various features of the rotors from a solid disk or by attaching components to a disk to form the various features. Alternatively, other methods may be used to produce a rotor 10, such as winding an elongate channel into a spiral.

A peripheral wall 29 is formed on the outer portion of disk 12 forming a sealing surface which, together with hub 19 and side walls 20, may be used to seal the outer and inner diameters and side walls 20, respectively, of the disk when mated against a substantially flat surface. In the exemplary embodiment shown in FIG. 1, disk 12 may be sealed against a flat surface by bolts (not shown) installed through bolt holes 28 located around the periphery 16 of disk 12. Alternatively, other means of sealing disk 12 may be used.

A single rotor 10 of the present invention could thus be assembled as a turbine, when mated with a sealing plate (not shown in FIG. 1) and connected to a source of steam or combustion gas. The steam or combustion gas travels through the turbine rotor 10, spiraling along channel 18, from first opening 22 to second opening 24 and imparting rotational motion to the rotor 10 by interaction with the blades 26. In an alternative embodiment, the working fluid may be caused to flow in a reverse fashion, with the fluid entering at the periphery 16 (second opening 24 now serves as an inlet) and exiting near the center 14 (first opening 22 now serves as the outlet). A preferred embodiment of the present invention utilizes a series of rotor disks 10 arranged in a stack, as described more fully below.

Figure 3:
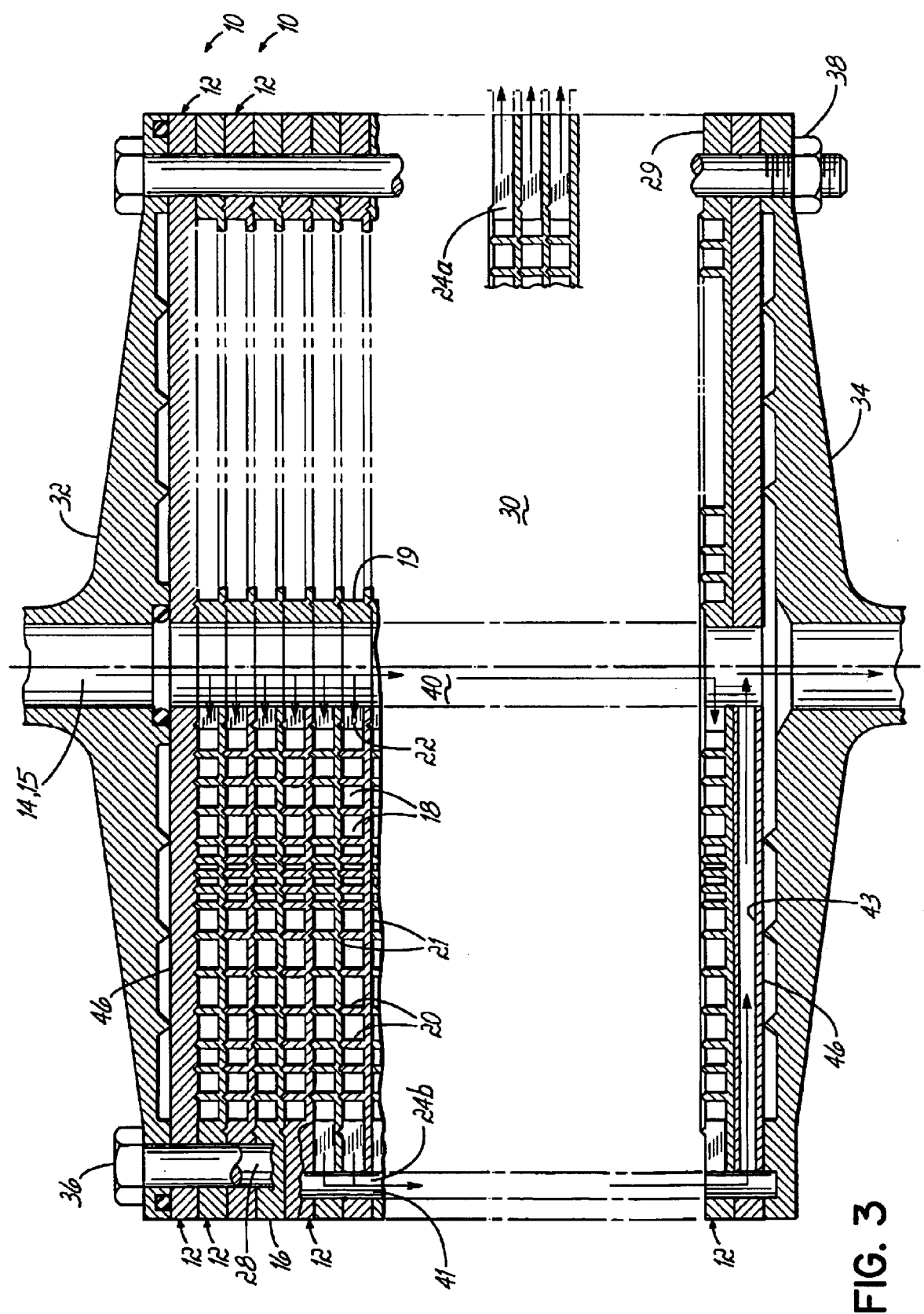
FIG. 3 is a cross-section view of another embodiment of the invention where a series of rotor disks of FIG. 1 are stacked together to form a turbine.

FIG. 3 depicts a turbine 30 which comprises a series of rotors 10 of the present invention assembled in a stack. The stacked rotors 10 are compressed together using an inlet flange plate 32, an outlet flange plate 34, and sealing plates 46 assembled against respective ends of the stack of rotors 10. Bolts 36, inserted through bolt holes 28, and nuts 38 are used to clamp the stack of rotor disks 10 together. Assembled in this fashion, the hub 19 and peripheral wall 29 of each successive disk respectively seal the inner and outer portions of the disks 12. Within an individual rotor 10, the entire length of a channel 18 is compression-sealed against the preceding rotor 10 or, when the rotor is at the end of the stack, a sealing plate 46 to form a liquid and gas tight flow path that is free from leakage. As further illustrated in FIG. 3, the central holes 15 of the stacked rotors 10 form a central passage 40 that is in communication with each of the individual channels 18 of the turbine 30. In a similar manner, adjacent second openings 24b combine to form an outer passage 41 near the outer periphery 16 and in communication with each of the channels 18. Thus, in one exemplary embodiment, working fluid may enter the turbine 30 through central passage 40 to pass through the individual rotor channels 18 via first openings 22. The working fluid spirals along channels 18 and is discharged from openings 24b into outer passage 41. Passage 41 may further communicate with exhaust passage 43 to exit the turbine 30.

Alternatively, the working fluid may pass through turbine 30 in the opposite direction, entering the channels 18 at the outer passage 41 through second openings 24b and spiraling through the channels 18 to be discharged through first openings 22 and central passage 40. Advantageously, this reverse-type flow provides improved torque by placing the highest velocity flow of the working fluid in contact with the outermost portions of the rotors 10.

FIG. 4 shows detail of the side wall portions of rotor disk 10 and one way in which sealing of channel 18 may be accomplished. In this embodiment, a sealing edge 45 near the top of the side wall 20 runs the entire length of channel 18. The sealing edge 45 mates with a groove 47 formed in a spiral pattern on a bottom surface of disk 12 and configured to engage the sealing edge 45. As rotors 10 are assembled to form a stack, sealing edges 45 mate with grooves 47 to seal the entire length of each channel 18 against leakage within the rotor 10 and between successive rotors. The mating rotors 10, thus provide a turbine 30 which has gas-tight flow paths free of inter- and intrastage leakage. Furthermore, the blades 26 are fixed securely between the disks 12 so that the turbine 30 has improved resistance to damage against vibration. There are no stators which could interfere with the rotor blades, thus the need for exacting tolerances during manufacture of the rotors 10 is unnecessary.

The integral design of the rotor 10 is much more robust with regard to stress, compared to conventional axial flow turbines, and the turbine 30 may be run using low quality steam. In an exemplary embodiment, pressurized hot water may be supplied to the turbine inlet whereby the water expands to steam in the initial portions of the channel 18 and returns to liquid water in the final portions of the channel 18, after its energy has been spent imparting motion to the turbine 30. The turbine 30 of the present invention is thus capable of utilizing multiple phases of the working fluid within the rotor 10. These phases may be non-destructively and centrifugally separated such that the heaviest fluid fractions separate and collect on the outermost channel walls 20. Yet another advantage of the present invention is that rotor 10 and turbine 30 do not require additional seals, such as those used in conventional turbines, which have stators and rotors. Accordingly, efficiency losses due to these additional seals are eliminated by the present invention.

Figure 4B:
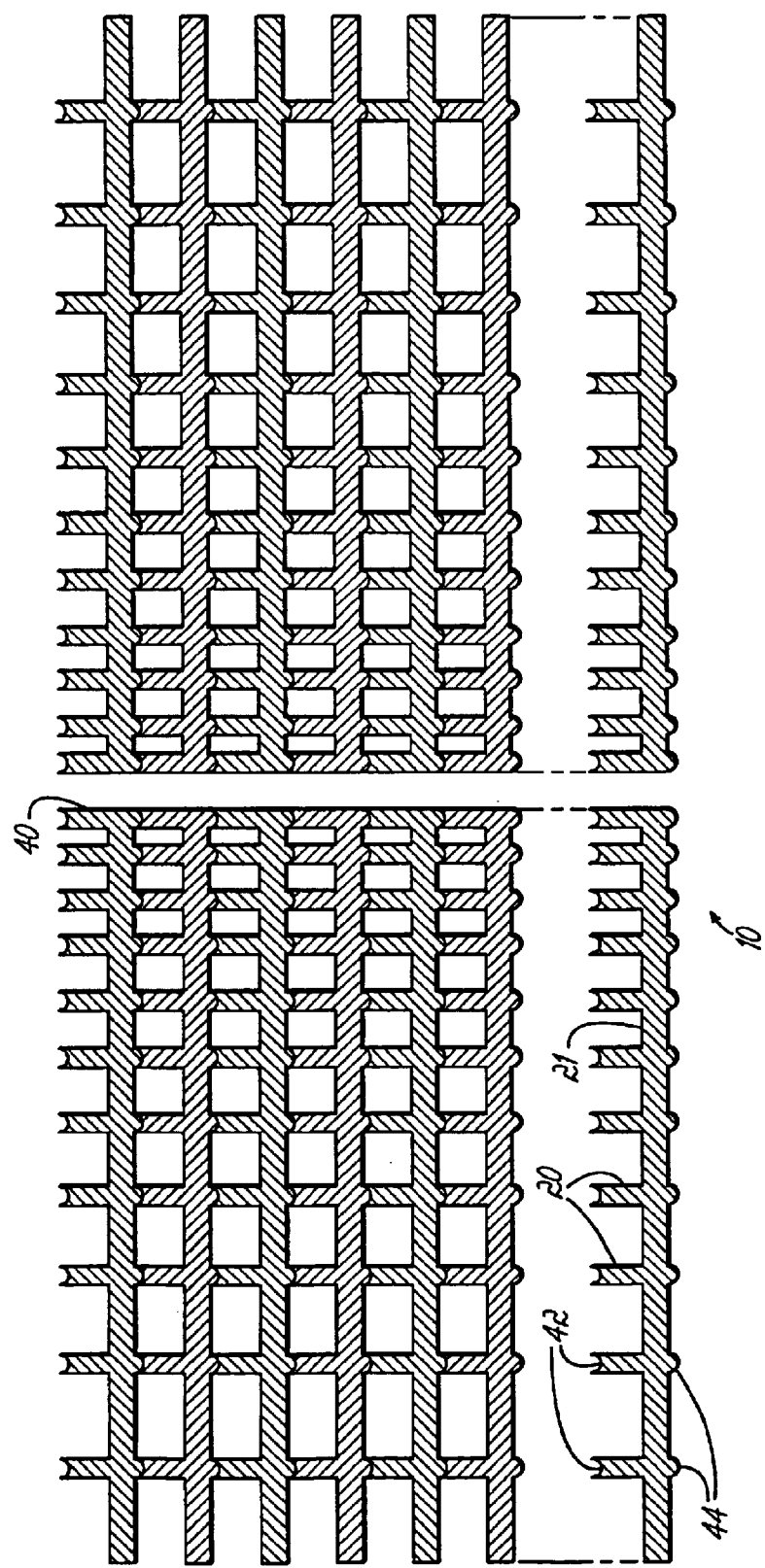
FIG. 4B is a detail view, similar to FIG. 4A, illustrating an alternative rotor construction.

FIG. 4B depicts another exemplary embodiment of a turbine rotor 12 of the invention and having a construction similar to that illustrated in FIG. 4A. In this embodiment, sidewalls 20 include a recess 42 near the top of the side wall and forming a spiral groove along the top of the channel 18. The spiral groove mates with a protrusion 44 formed in a spiral pattern on a bottom surface of disk 12 and configured to engage the spiral groove. Accordingly, as rotors 10 are assembled to form a stack, recesses 42 mate with protrusions 44 to seal the entire length of each channel 18, as described above.

As depicted in FIGS. 3 and 4A–4B, side walls 20 are arranged on rotor disk 12 such that the channel 18 formed on each disk may have varying cross-section or width. This varying of cross-section permits expansion or contraction of the flow path through which the working fluid travels around the rotor 10. The expansion and contraction of the flow path may be utilized to accommodate various states of the working fluid, whereby the working fluid may contract and/or expand as it travels through the channel 18. The length of channel 18 may also be extended or shortened, as desired, to suit specific design parameters. In an exemplary embodiment, various "stages" of the flow path along channels 18 and within a single disk 12 may be specifically designed for high-pressure, intermediate-pressure, and low-pressure flows to better handle the working fluid pressure drop through the rotor 10. Alternatively, individual disks 12 of a stack of rotors 10 may be configured to accommodate high-pressure, intermediate-pressure, and low-pressure flows, as may be desired.

Referring to FIGS. 5A–5D, various embodiments of the rotor blades 26 in channel 18 are depicted. FIG. 5A shows blades 26*a* attached to the walls 20 and angled relative to the walls 20 in a direction opposite the flow of the working fluid (indicated by an arrow). FIG. 5B depicts blades 26*b* attached to walls 20 and angled in a direction with the flow of the working fluid. FIG. 5C depicts blades 26*c* attached to walls 20 and extending into the channel 21, substantially perpendicular to walls 20. FIG. 5D depicts U-shaped blades positioned across the width of channel 21 to form baffles. Blades 26, as well as other components of the rotor 10, may be formed from metallic materials, ceramics, cermet, or composite materials, as desired.

When a turbine of the present invention is configured to utilize steam as the working fluid, it may be desired to construct portions of the channel 18 to have a smooth wall configuration (i.e., no blades) to facilitate the collection and movement of condensate within the channel 18. In this regard, the rotor 12 may further include one or more devices, commonly referred to as scoops (not shown), within the channel 18 to permit withdrawal of such condensate. Accordingly, condensate may be centrifugally separated from vapor along outer channel walls.

What is claimed is:

1. A turbine rotor comprising:
   a disk mounted for rotational movement and having first and second sides, a center and a peripheral edge;
   a spiral channel formed into said first side of said disk, said channel having opposing sidewalls integral with said disk, a first opening and a second opening; and
   a plurality of blades disposed within said channel and along each of said opposing sidewalls, said blades arranged and spaced to interact with a working fluid of a turbine as the working fluid is directed along said channel between said first opening and said second opening, whereby the working fluid may impart rotational motion to said disk.

2. The rotor of claim 1, further comprising a peripheral sidewall formed on said first side of said disk.

3. The rotor of claim 1, further comprising sealing structure proximate said first side of said disk and configured to engage a surface coupled to said disk adjacent a top edge of said channel to thereby seal said channel.

4. The rotor of claim 1, wherein said first opening is located proximate said center of said disk and said second opening is located proximate said peripheral edge.

5. The rotor of claim 1, wherein said channel has a cross-sectional flow area which varies along the length of said channel.

6. The rotor of claim 5, wherein the variation in said flow area is configured to accommodate expansion and contraction of the flow through said channel.

7. A turbine rotor comprising:
   a disk mounted for rotational movement and having first and second sides, a center and a peripheral edge;
   a spiral channel formed on said first side of said disk, said channel having opposing sidewalls, a first opening and a second opening; and
   a plurality of blades disposed within said channel and along each of said opposing sidewalls, said blades arranged and spaced to interact with a working fluid of a turbine as the working fluid is directed along said channel between said first opening and said second opening, whereby the working fluid may impart rotational motion to said disk;
   wherein said second opening includes a passage directed along an axis substantially parallel to the rotational axis of said disk.

8. A turbine rotor comprising:
   a disk mounted for rotational movement and having first and second sides, a center and a peripheral edge;
   a spiral channel formed on said first side of said disk, said channel having opposing sidewalls, a first opening and a second opening; and
   a plurality of blades disposed within said channel and along each of said opposing sidewalls, said blades arranged and spaced to interact with a working fluid of a turbine as the working fluid is directed along said channel between said first opening and said second opening, whereby the working fluid may impart rotational motion to said disk;
   wherein said second opening includes a passage directed substantially radially with respect to said disk.

9. A turbine rotor comprising:
   a disk mounted for rotational movement and having first and second sides, a center and a peripheral edge;
   a spiral channel formed on said first side of said disk, said channel having opposing sidewalls, a first opening and a second opening;
   a plurality of blades disposed within said channel and along each of said opposing sidewalls, said blades arranged and spaced to interact with a working fluid of a turbine as the working fluid is directed along said channel between said first opening and said second opening, whereby the working fluid may impart rotational motion to said disk; and sealing structure proximate said first side of said disk and configured to engage a surface coupled to said disk adjacent a top edge of said channel to thereby seal said channel, said sealing structure comprising:

a recess formed into a top edge of said channel wall, said recess forming a continuous spiral groove from said first opening to said second opening; and a spiral protrusion formed on said second side of said disk and configured to correspond with said continuous spiral groove formed in said channel wall, whereby a plurality of said disks may be stacked such that the protrusion on one disk is received by the spiral groove on an adjacent disk to operatively seal said channel.

10. A turbine rotor comprising:

a disk mounted for rotational movement and having first and second sides, a center and a peripheral edge;

a spiral channel formed integrally into said first side of said disk, said channel having a first opening and a second opening; and a plurality of generally U-shaped blades disposed within said channel, said blades arranged and spaced to interact with a working fluid of a turbine as the working fluid is directed along said channel between said first opening and said second opening, whereby the working fluid may impart rotational motion to said disk.

11. The rotor of claim 10, further comprising sealing structure proximate said first side of said disk and configured to engage a surface coupled to said disk adjacent a top edge of said channel to thereby seal said channel.

12. A turbine comprising:

a rotatable shaft; and a plurality of disks coupled to said shaft for rotational movement therewith;

each said disk comprising:

first and second sides, a center and a peripheral edge, a spiral channel formed into said disk and having opposing sidewalls integral with said disk, a first opening and a second opening, and a plurality of blades disposed within said channel and arranged and spaced to interact with a working fluid of the turbine as the working fluid is directed along said channel between said first opening and second opening, whereby the working fluid may impart rotational motion to said disk.

13. The turbine of claim 12, wherein each said disk further comprises a peripheral sidewall formed on said first side of said disk.

14. The turbine of claim 12, wherein each said disk further comprises sealing structure proximate said first side of said disk and configured to engage a surface coupled to said disk adjacent a top edge of said channel to thereby seal said channel.

15. A turbine comprising:

a rotatable shaft; and a plurality of disks coupled to said shaft for rotational movement therewith;

each said disk comprising:

first and second sides, a center and a peripheral edge, a spiral channel formed an said disk and having opposing sidewalls, a first opening and a second opening, a plurality of blades disposed within sold channel and arranged and spaced to interact with a working fluid of the turbine as the working fluid is directed along said channel between said first opening and second opening, whereby the working fluid may impart rotational motion to said disk, and sealing structure proximate said first side of said disk and configured to engage a surface coupled to said disk adjacent a top edge of said channel to thereby seal said channel, said sealing structure comprising:

a recess formed into a top edge of said channel wall, said recess forming a continuous spiral groove from said first opening to said second opening; and a spiral protrusion formed on said second side of said disk and configured to correspond with said continuous spiral groove formed in said channel wall, whereby said plurality of disks may be stacked such that the protrusion on one disk is received by the spiral groove on an adjacent disk to operatively seal said channel.

16. A method of operating a turbine having one or more rotors with enclosed channels formed in a planar spiral, the method comprising:

supplying a working fluid substantially comprising liquid water at an inlet to the turbine;

moving the working fluid through the turbine along the spiral channel;

expanding the liquid water to a vapor in a portion of the channel; and condensing the vapor to liquid water in a portion of the channel;

the expanding and condensing occurring during flow through the channel in the same direction.

17. A method of operating a turbine having one or more rotors with enclosed channels formed in a planar spiral, the method comprising:

supplying a working fluid substantially comprising liquid water at an inlet to the turbine;

moving the working fluid through the turbine along the spiral channel;

expanding the liquid water to a vapor in a portion of the channel;

condensing the vapor to liquid water in a portion of the channel;

separating the working fluid according to density within the turbine; and collecting heavier fluid fractions on outermost portions of the channel.

18. A turbine rotor comprising:

a disk mounted for rotational movement and having first and second sides, a center and a peripheral edge;

a spiral channel formed on said first side of said disk, said channel having opposing sidewalls, a first opening and a second opening; and a plurality of blades disposed within said channel and along each of said opposing sidewalls, said blades arranged and spaced to interact with a working fluid of a turbine as the working fluid is directed along said channel between said first opening and said second opening, whereby the working fluid may impart rotational motion to said disk;

wherein said channel has a cross-sectional flow area which varies along the length of said channel;

wherein the variation in said flow area is configured to accommodate expansion and contraction of the working fluid during flow through said channel in a single direction.

* * * * *